United States Patent Office 3,756,998
Patented Sept. 4, 1973

---

3,756,998
POLYMERIZATION OF OLEFINS USING SUPPORTED π-ARENECHROMIUM TRICARBONYL CATALYSTS
George Leo Karapinka, Piscataway, N.J., assignor to Union Carbide Corporation, New York, N.Y.
No Drawing. Continuation of abandoned application Ser. No. 767,508, Oct. 14, 1968. This application Apr. 23, 1971, Ser. No. 137,083
Int. Cl. C08f 1/58, 3/06
U.S. Cl. 260—88.2 R          14 Claims

ABSTRACT OF THE DISCLOSURE

π-Arenechromium tricarbonyls when supported on an activated silica or silica-alumina support become catalytically active for the polymerization of olefins, particularly ethylene, to high molecular weight solid polymers under a variety of conditions.

---

This application is a streamline continuation of Ser. No. 767,508, filed Oct. 14, 1968, and now abandoned.

BACKGROUND OF THE INVENTION

This invention relates to the polymerization of olefins particularly to the polymerization of ethylene to form polyethylene and interpolymers of ethylene with α-olefins and diolefins.

It is known in the art to use compounds containing chromium as components of catalysts systems for the polymerization of olefins. Most systems, however, require some pretreatment of the chromium containing component such as heating to elevated temperatures of the order of 750° F. or more or chemical reduction with a co-catalyst to make them utile.

The present invention is based on the discovery that a certain class of chromium containing compounds namely, the π-arenechromium tricarbonyls become active catalyst without further prepolymerization treatment by merely depositing them on an activated silica or silica-alumina support.

In addition to being an active olefin polymerization catalyst, it is most interesting that the supported π-arenechromium tricarbonyls remains active in the inherent presence of carbonyl groups. Carbon monoxide complexed transition metal compounds are well known to be inactive in olefin polymerization and therefore normally avoided. Yet, it has been unexpectedly found that the carbonyl groups do not in any way reduce or deter the activity of the catalysts of this invention.

SUMMARY OF THE INVENTION

It has now been found that the π-arenechromium tricarbonyls which are normally incapable of initiating the polymerization of ethylene, become active ethylene polymerization catalysts when contacted with an activated silica or silica-alumina support in such a manner that the π-arenechromium tricarbonyl becomes adsorbed or deposited on the support. With the catalyst of this invention it is possible to produce polyethylene and interpolymers of ethylene and other α-olefins and diolefins.

DESCRIPTION

According to the present invention π-arenechromium tricarbonyls become surprisingly active olefin polymerization catalysts when adsorbed or deposited on an activated silica or silica-alumina support without need for further prepolymerization treatments such as heating or reduction with a co-catalyst.

As used herein the term "π-arenechromium tricarbonyls" include substituted and unsubstituted π-benzenechromium tricarbonyls and cyclotrienechromium tricarbonyls containing up to one substituent per carbon atom. Among the substituents which do not deter catalytic activity and which may be present on the benzene ring are hydrocarbyl radicals containing from 1 to 14 carbon atoms such as alkyl, alkaryl, aralkyl, and aryl radicals; the alkoxide radicals; halogen radicals, and the like. The preferred π-arenechromium tricarbonyls are π-benzene chromium tricarbonyl and alkyl substituted π-benzenechromium tricarbonyls. Illustrative but no wise limiting or complete, the following π-arenechromium tricarbonyls may be used in the practice of this invention:

π-benzene chromium tricarbonyl
π-methylbenzenechromium tricarbonyl
π-dimethyl benzenechromium tricarbonyl
π-mesitylene chromium tricarbonyl
π-hexamethylbenzenechromium tricarbonyl
π-chlorobenzenechromium tricarbonyl
π-cumenechromium tricarbonyl
π-ethylbenzenechromium tricarbonyl
π-iodobenzenechromium tricarbonyl
π-biphenylchromium tricarbonyl
π-anthracenechromium tricarbonyl
π-naphthalenechromium tricarbonyl
π-tetrahydronaphthalenechromium tricarbonyl
π-cycloheptatrienechromium tricarbonyl and the like.

The π-arenechromium tricarbonyl compounds used to prepare the catalyst of this invention may be conveniently obtained by contacting the desired arene with chromium hexacarbonyl in an inert solvent, preferably under an inert atmosphere, at an elevated temperature, generally from about 150 to 230° C. at pressures ranging from atmospheric to that generated in a sealed reaction vessel and the like. Details as to their preparation are published in British patent specification 856,354 and Italian Pat. 594,612 which corresponds to British patent specification 914,764 incorporated herein by reference.

Prepared according to the above-mentioned techniques the π-arenechromium tricarbonyls have the general structure

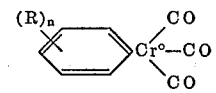

wherein R is the desired substituent group and n is the number of substituents on the benzene ring.

The formation of the supported π-arenechromium tricarbonyl catalysts of this invention results from adsorbing the selected π-arenechromium compound on an activated silica or silica-alumina support having a high surface area. Adsorption is achieved by the deposition of the π-arenechromium tricarbonyl on the support by adsorption from a hydrocarbon solvent or by vapor deposition (sublimation) of the π-arenechromium compound on the support in the absence of a solvent.

Preferably, the π-arenechromium tricarbonyl is contacted with a substantially anhydrous silica or silica-alumina support having a high surface area under conditions such that the π-arenechromium tricarbonyl is adsorbed on and supported by the support. The supports are, as noted above, silica, and silica-alumina, all of which activate the π-arenechromium tricarbonyl. For the catalyst to be highly effective, these supports should have a high surface area to adsorb a sufficient quantity of the π-arenechromium tricarbonyl compound and provide sufficient contact between the catalyst and the reactive monomer. As a general rule, supports having a surface area in the range from about 50 to about 1000 square meters per gram should be employed as the catalyst support, although the particle size of these supports is not particularly critical.

The catalyst support should be preferably completely dried before it is brought into contact with the π-arenechromium tricarbonyl. Drying is normally achieved by simple heating of the catalyst support with an inert gas prior to use. Drying or activation of the support can be accomplished at nearly any temperature up to about its sintering temperature for a period of time at least sufficient to remove the adsorbed water but avoiding contact which will remove all of the chemically bound water. Desirably, an inert gas stream through the support during the drying aids in displacement. Temperatures of from about 200° to 900° C. for a short period of about six hours or so should be sufficient if a well dried inert gas is used and the temperature not be permitted to get so high as to remove the chemically bound hydroxyl groups on the surface of the support.

Any grade of support can be used herein but the microspheroidal intermediate density (MSID) silica is preferred for the high melt index resins. This grade has a surface area of 258 square meters per gram and a pore diameter of about 288 A., although the intermediate density (ID) silica having the same area but a pore diameter of 164 A. is satisfactory. Other grades such as the G-968 silica and G-966 silica-alumina, as designated by W. R. Grace and Co., having surface areas of 700 and 500 square meters per gram, respectively, and pore diameters of 50-70 A. are also quite satisfactory. Variations in melt index control and in polymer productivity can be expected between different grades of supports.

After the supported catalyst systems of this invention have been formed, the polymerization reaction is conducted by contacting ethylene, substantially in the absence of moisture and of air, with a catalytic amount of the supported π-arenechromium tricarbonyl catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of other olefin monomers, the particular catalyst and its concentration. Naturally, the selected operating temperature is also dependent upon the desired polymer melt index since temperature is definitely a factor in adjusting the molecular weight of the polymer. Preferably, the temperature is from about 30° C. to about 100° C. in the slurry or "particle forming" technique and from 100° C. to 200° C. in "solution forming." The control of temperature in this process is desirable as hereinafter more fully described in providing various effects upon molecular weight of the polymers as well as in controlling the phase in which they are made. As with most catalytic systems, the higher temperatures produce the lower weight average molecular weight polymers and consequently of high melt index. In fact, by operating at the higher polymerization temperatures, polymers of a melt index of 100 to 1000 or more are possible and can be characterized as waxes, even though still of high density.

The pressure can be any pressure sufficient to initiate the polymerization of the monomer to high polymer and can be carried out from subatmospheric pressure, using an inert gas as diluent, to superatmospheri pressure up to about 1,000,000 p.s.i.g. or more, but the preferred pressure is from atmospheric up to about 1000 p.s.i.g. As a general rule, pressure of 20 to 800 p.s.i.g. is preferred.

The inert organic solvent medium when employed in this invention is not narrowly critical but it should be inert to the supported π-arenechromium tricarbonyl catalyst and olefin polymer produced and stable at the reaction temperature used. It is not necessary, however, that the inert organic solvent medium serve also as a solvent for the polymer produced. Among the inert organic solvents applicable for such purpose may be mentioned saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene tetrachloroethylene, orthodichlorobenzene, and the like. Particularly preferred solvent media are cyclohexane, pentane, hexane and heptane.

When it is desired to conduct the polymerization to a high solids level as hereinbefore set forth, it is of course desirable that the solvent be liquid at the reaction temperature. For example, operating at a temperature less than the solution temperature of the polymer in the solvent, the process can be essentially a slurry or suspension polymerization process in which the polymer actually precipitates out of the liquid reaction medium and in which the supported π-arenechromium tricarbonyl catalyst is suspended in a finely divided form.

This slurry system is of course dependent upon the particular solvent employed in the polymerization and its solution temperature for the polymer prepared. Consequently, in the "particle form" embodiment, it is most desirable to operate at a temperature less than the normal solution temperature of the polymer in the selected solvent. As for example, polyethylene prepared herein has a solution temperature in cyclohexane of about 90° C. and whereas in pentane its solution temperature is about 110° C. It is characteristic of this "particle form" polymerization system that the high polymer solids content is possible even at low temperatures provided agitation is present to enable adequate mixing of the monomer with the polymerizing mass. It appears that while the polymerization rate may be slightly slower at the lower temperatures, the monomer is more soluble in the solvent medium thus counteracting any tendency to low rates and/or low yields.

It is also characteristic that the monomer appears to have substantial solubility characteristics even in the solids portion of the slurry so that as long as agitation is provided and polymerization temperature maintained, a broad range of size of solid particles in the slurry can be provided. Experience has shown that the slurry technique can produce better than fifty percent solids system, provided sufficient fluidizing conditions and agitation is maintained. It is particularly preferable to operate the slurry process in the range of 30-40 weight percent of polymer solids.

Operating at temperatures higher than the solution temperature of the polymer in the selected solvent medium also can produce a high polymer solids content in solution. The temperature in this embodiment must be sufficiently high to enable the solvent being used to dissolve at least 25-30 percent by weight of the polymer. On the other hand, the temperature must be sufficiently low to avoid thermal destruction of the formed polymer and the particular π-arenechromium tricarbonyl employed. In general, for the various solvents and π-arenechromium tricarbonyl used, temperatures within the range of about 100° C. to about 200° C. and preferably about 120° C. to about 170° C. have been found to be generally optimum for the practice of such solution polymerization. However, the particular polymer being produced also has a significant effect on the optimum temperature. For example, ethylene-propylene copolymers produced by this process are soluble in many of these organic solvents at low temperatures and hence the use of such temperatures is permissible in this invention even though such temperatures may not be desired for optimum production of ethylene homopolymers or copolymers.

Solvents constitute one of the most significant and vexing sources of catalyst poisoning. Moreover, in prior solution polymerization processes employing transition metal-containing catalysts, the use of large quantities of solvent, i.e., a solvent-to-polymer ratio of the order of 20:1 was believed necessary. Such large proportions of solvent necessarily greatly increased the catalyst poisoning problem. In the present process, however, the proportion of solvent to polymer can be as low as 1:1 or even less, thereby maintaining very high catalyst productivity and efficiency of the system.

When the solvent serves as the principal reaction medium, it is of course desirable to maintain the solvent medium substantially anhydrous and free of any possible catalyst poisons, by redistilling or otherwise purifying the solvent before use in this process. Treatment with an adsorbent such as high surface area silicas, aluminas, molecular sieves and like materials are beneficial in removing trace amounts of contaminants that may reduce the polymerization rate or poison the catalyst during the reaction.

However, it is also possible to operate the polymerization reaction without an added solvent reaction medium, if desired. For example, the liquid monomer itself can be the reaction medium, either by using normally liquid monomers, or by using liquified normally gaseous monomers, such as liquified propylene when making ethylene-propylene copolymers.

Still another advantage of the present process is provided by maintaining the catalyst and the polymer, as formed, in homogeneous solution in the solvent medium. By avoiding the formation of a polymer suspension, the reaction mass behaves surprisingly as a viscous fluid which can be pumped and handled by any of the standard techniques for handling fluids.

Still another advantage of having the polymer soluble in the diluent is that high reaction temperatures can be employed. This is advantageous because the high temperatures reduce the viscosity of the solution, they also cause the polymerization to proceed faster, and allow more efficient removal of the heat of reaction because of the large temperature differential between the reactor and the cooling water, and also permit control of the polymer molecular weight since high reaction temperatures generally cause the formation of lower molecular weight polymer.

To separate the polymer from the solvent medium, it is also possible to employ precipitation and filtration techniques to recover the polymer, or to concentrate the polymer/solvent mass by flash evaporation or other means of solvent removal followed by high shear milling. A number of suitable high shear mills are commercially available and, because of the low solvent content of the solution to be treated, other devices such as vented extruders, calendering roll mills, planetary rotor mills, Banbury mills, and the like, can be successfully employed to accomplish isolation of the polymer product. By the term "high shear mill" as used hereinafter is meant a mill comprising parallel rolls having intermeshing threads, and the term "high shear conditions" and "conditions of high shear" mean those conditions achieved on a high shear mill or by adequately powered high speed mixers for viscous materials.

It should be understood that the high solids system can be employed with the catalyst suspended in the solvent, provided that the necessary conditions of agitation, pressure, temperature and the like are maintained so to provide contact of the monomer with the catalyst, and that the pressure and temperature are such as to initiate the polymerization of that monomer to the polymer.

It should also be understood that the invention herein contemplated includes the techniques of fluidizing the solid catalyst bed in a gaseous system and contacting it with a gaseous olefin feed thereby eliminating the use of liquid solvents and the attendant problems of solvent separation and catalyst poisons as hereinbefore mentioned.

The amount of concentration of supported π-arenechromium tricarbonyl catalyst employed in this invention is not critical and primarily only affects the rate and yield of polymer secured. It can be varied from about 1 to 25,000 parts per million catalyst based on the weight of olefin charged. Preferably and for greatest economy of operation, the catalyst concentration is maintained from about 5 to 100 parts per million. Obviously, the lower the impurity level in the reaction system, the lower the catalyst concentration that can be used. Experience has shown that yields greater than 5000 parts of polymer per part of π-arenechromium tricarbonyl may be obtained. In such catalysts, the weight of the support is generally from 10 to 100 times the weight of the π-arenechromium tricarbonyl compound. However, this ratio is not critical and can be widely varied.

Among the α-olefins which can be polymerized with ethylene in accordance with the invention are those containing from 3 to about 10 carbon atoms. Illustrative thereof but not limiting are propylene, butene-1, pentene-1, 3-methylbutene-1, hexene-1, 4-methylpentene-1, 3-ethylbutene-1, heptene-1, octene-1, decene-1, 4,4-dimethylpentene-1, 4,4-diethylhexene-1, 3,4-dimethylhexene-1, 4-butyl-1-octene, 5-ethyl-1-decene, 3,3-dimethylbutene-1, and the like. Such compounds can be polymerized in combination with a major amount of ethylene to yield normally solid, high molecular weight interpolymers of ethylene and one or more α-olefins. Ethylene (alone or with minor amounts of other α-olefins) may also be polymerized with a diolefin to yield normally solid, cross-linkable interpolymers. Among the diolefins which may be used are butadiene, 1,5-hexadiene, dicyclopentadiene, ethylidene norbornene and the like. Polyethylene is the particularly preferred homopolymer. Preferred interpolymers are those containing a major proportion of interpolymerized ethylene along with a minor proportion of any other monomer copolymerizable therewith. The particularly preferred interpolymers are ethylene-propylene or ethylene-butene interpolymers, having up to about 20 weight percent of the interpolymerized propylene or butene.

Care should be taken during the polymerization to avoid the introduction of moisture, air and oxygen, all of which are catalyst poisons.

Conducting the polymerization reaction in the presence of hydrogen, which appears to function as a chain transfer agent, the molecular weight of the polymer may be controlled. Experience has shown that hydrogen may be used in the polymerization reaction in amounts varying between about 0.001 to about 10 moles of hydrogen per mole of ethylene. For most polymerization reactions, a narrow molecular weight distribution may be obtained by using from about 0.01 to about 0.5 mole of hydrogen per mole of ethylene. Stated another way, the preferred range of hydrogen is from about 0.001 to about 5 mole percent, based on the total reactor contents.

As previously mentioned, the supported π-arenechromium tricarbonyls are active catalysts for olefin polymerization without further prepolymerization treatment or reduction with a co-catalyst. Compounds such as aluminum alkyl, alkyl aluminum halides and organic aluminum compounds however, may be added to the reaction system to eliminate any poisons contained therein. It must be pointed out however, that their presence in the reaction system does not enhance the activity of the supported π-arenechromium tricarbonyl catalysts of this invention.

The following examples illustrate the ease with which ethylene can be polymerized with the supported π-arenechromium tricarbonyl catalysts of this invention. In the following examples melt flow was measured according to ASTM test method D–1238–62T, at a pressure of 440 p.s.i.g. and 190° C.

Example I

Into a stirred 1 liter autoclave continually purged with nitrogen there was placed 500 ml. of dry hexane, 0.5 gram of a silica alumina which had been previously dried by fluidizing in nitrogen at 600° C. for 18 hours. π-benzenechromium tricarbonyl in an amount of 10 mg. was introduced and the reactor sealed. The reactor was heated to 90° C. and pressurized with ethylene to a total pressure of 400 p.s.i.g. The reaction was continued for 2 hours during which ethylene was fed on demand to maintain a constant reactor pressure. After 2 hours the reactor was cooled to 70° C. then vented and dismantled. There was obtained 49 grams of polyethylene having a melt flow of 0.30 dgm./min.

Example II

Using the same procedure as in Example I a polymerization was conducted using a supported catalyst composed of 10 mg. π-benzenechromium tricarbonyl and 0.5 gram of 968 silica (Davis Co.) which had been previously dried at 500° C. for 18 hours. After a polymerization period of 1.5 hours at 90° C., 44 grams of a polyethylene having a melt flow of 0.075 dgm./min. was obtained.

Example III

Following the procedure in Example I a polymerization was carried out using a catalyst composite of 10 mg. of π-mesitylenechromium tricarbonyl supported on 0.5 gram of silica aluminum which had been previously activated at 420° C. for 18 hours.

After a reaction period of 2 hours at 90° C., 21 grams of a polyethylene having a melt flow of 1.3 dgm./min. was obtained.

What is claimed is:

1. A process for the polymerization of ethylene which comprises contacting ethylene with a catalystic amount of a chromium tricarbonyl compound selected from the group consisting of π-benzene chromium tricarbonyl,
π-methylbenzene chromium tricarbonyl,
π-dimethylbenzene chromium tricarbonyl,
π-mesitylene chromium tricarbonyl,
π-hexamethylbenzene chromium tricarbonyl,
π-chlorobenzene chromium tricarbonyl,
π-cumene chromium tricarbonyl,
π-ethylbenzene chromium tricarbonyl,
π-iodobenzene chromium tricarbonyl,
π-biphenyl chromium tricarbonyl,
π-anthracene chromium tricarbonyl,
π-naphthalene chromium tricarbonyl,
π-tetrahydronaphthalene chromium tricarbonyl, and
π-cycloheptatriene chromium tricarbonyl, said chromium tricarbonyl compound being adsorbed on an activated inorganic oxide catalyst support which has been activated in an inert gas and having a surface area in the range of about 258 to 1000 square meters per gram and selected from the group consisting of silica and silica-alumina, at a temperature of about 30 to about 200° C. and at a pressure of about 20 p.s.i.g. to about 800 p.s.i.g. to form a normally solid polymer.

2. The process according to claim 1, in which ethylene is homopolymerized to a normally solid, high molecular weight polyethylene.

3. The process according to claim 1, in which a major amount of ethylene and a minor amount of at least one other α-olefin are interpolymerized to a normally solid, high molecular weight interpolymer of ethylene and the α-olefin.

4. The process according to claim 1, in which a major amount of ethylene and a minor amount of at least one diolefin are interpolymerized to a normally solid, crosslinkable interpolymer.

5. The process according to claim 1 in which the chromium tricarbonyl compound is π-benzene chromium tricarbonyl.

6. The process according to claim 1 in which the chromium tricarbonyl compound is π-mesitylene chromium tricarbonyl.

7. The process according to claim 1, in which the polymerization reaction is conducted in the presence of hydrogen.

8. A process for the polymerization of ethylene which comprises
  (a) contacting chromium tricarbonyl compound selected from the group consisting of
    π-benzene chromium tricarbonyl,
    π-methylbenzene chromium tricarbonyl,
    π-dimethylbenzene chromium tricarbonyl,
    π-mesitylene chromium tricarbonyl,
    π-hexamethylbenzene chromium tricarbonyl,
    π-chlorobenzene chromium tricarbonyl,
    π-cumene chromium tricarbonyl,
    π-ethylbenzene chromium tricarbonyl,
    π-iodobenzene chromium tricarbonyl,
    π-biphenyl chromium tricarbonyl,
    π-anthracene chromium tricarbonyl,
    π-naphthalene chromium tricarbonyl,
    π-tetrahydronaphthalene chromium tricarbonyl, and
    π-cycloheptatriene chromium tricarbonyl,
  with a substantially anhydrous inorganic oxide catalyst support activated in an inert gas and having a surface area in the range from about 258 to about 1000 square meters per gram and selected from the group consisting of silica and silica-alumina in such manner that the chromium tricarbonyl compound is adsorbed on the inorganic oxide support, and
  (b) contacting ethylene in the substantial absence of moisture and of oxygen with a catalytic amount of the inorganic oxide supported chromium tricarbonyl compound at a temperature of about 30° C. to about 200° C. and at a pressure of about 20 p.s.i.g. to about 800 p.s.i.g. to form a normally solid, high molecular weight polyethylene.

9. A process according to claim 8 in which the inorganic oxide catalyst support is silica.

10. The process according to claim 9, in which the polymerization reaction is conducted in the presence of from about 0.001 to about 10 moles of hydrogen per mole of ethylene.

11. A catalyst for the polymerization of ethylene comprising chromium tricarbonyl compound selected from the group consisting of:
  π-benzene chromium tricarbonyl,
  π-methylbenzene chromium tricarbonyl,
  π-dimethylbenzene chromium tricarbonyl,
  π-mesitylene chromium tricarbonyl,
  π-hexamethylbenzene chromium tricarbonyl,
  π-chlorobenzene chromium tricarbonyl,
  π-cumene chromium tricarbonyl,
  π-ethylbenzene chromium tricarbonyl,
  π-iodobenzene chromium tricarbonyl,
  π-biphenyl chromium tricarbonyl,
  π-anthracene chromium tricarbonyl,
  π-naphthalene chromium tricarbonyl,
  π-tetrahydronaphthalene chromium tricarbonyl, and
  π-cycloheptatriene chromium tricarbonyl,
adsorbed on an activated inorganic oxide catalyst support which has been activated in an inert gas and having a surface area of about 258 to about 1000 square meters per gram and selected from the group consisting of silica and silica-alumina.

12. A catalyst for the polymerization of ethylene comprising π-benzene chromium tricarbonyl adsorbed on an activated inorganic oxide catalyst support which has been activated in an inert gas and having a surface area of about 258 to about 1000 square meters per gram and selected from the group consisting of silica and silica-alumina.

13. A catalyst for the polymerization of ethylene comprising π-mesitylene chromium tricarbonyl adsorbed on an activated inorganic oxide catalyst support which has been activated in an inert gas and having a surface area of about 258 to about 1000 square meters per gram and selected from the group consisting of silica and silica-alumina.

14. A process according to claim 8 in which the inorganic oxide catalyst support is silica-alumina.

References Cited

UNITED STATES PATENTS

| | | |
|---|---|---|
| 3,361,779 | 1/1968 | Coffield et al. _____ 260—94.9 B |
| 3,157,712 | 11/1964 | Walker et al. ____ 260—94.9 D A |
| 3,463,827 | 8/1969 | Banks _____ 260—94.9 D A |
| 3,324,101 | 6/1967 | Baker et al. ____ 260—94.9 D A |

JOSEPH L. SCHOFER, Primary Examiner

E. J. SMITH, Assistant Examiner

U.S. Cl. X.R.

252—430, 431 R; 260—85.3, 94.9 D A